United States Patent
Riley et al.

(10) Patent No.: US 8,359,048 B2
(45) Date of Patent: Jan. 22, 2013

(54) CLOSE PROXIMITY ALERT MESSAGING SYSTEM AND METHOD

(75) Inventors: James W Riley, Rochester, NY (US); Steven Markham, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 505 days.

(21) Appl. No.: 12/370,905

(22) Filed: Feb. 13, 2009

(65) Prior Publication Data

US 2010/0210290 A1    Aug. 19, 2010

(51) Int. Cl.
- H04W 4/00    (2009.01)
- H04M 11/04    (2006.01)
- H04W 24/00    (2009.01)

(52) U.S. Cl. .................. 455/466; 455/404.2; 455/456.1

(58) Field of Classification Search ............... 455/404.1, 455/404.2, 456.1–456.6, 521, 567; 340/686.1
See application file for complete search history.

(56) References Cited

U.S. PATENT DOCUMENTS

| | | | |
|---|---|---|---|
| 6,570,503 | B1 | 5/2003 | Ulert et al. |
| 7,228,121 | B2 | 6/2007 | Kennedy |
| 7,324,810 | B2 | 1/2008 | Nave et al. |
| 2002/0118118 | A1 | 8/2002 | Myllymaki et al. |
| 2004/0266389 | A1* | 12/2004 | Kennedy ............... 455/404.1 |
| 2005/0086261 | A1* | 4/2005 | Mammone ............. 707/104.1 |
| 2008/0166992 | A1* | 7/2008 | Ricordi et al. ......... 455/404.2 |
| 2008/0169920 | A1 | 7/2008 | Spence |
| 2009/0117926 | A1* | 5/2009 | Sterlino ..................... 455/466 |

* cited by examiner

Primary Examiner — Kent Chang
Assistant Examiner — Chayce Bibbee
(74) Attorney, Agent, or Firm — Taft Stettinius & Hollister LLP; Keith Swedo

(57) ABSTRACT

An alert broadcast method includes wirelessly transmitting a first message from a first cellular communication device to a central transceiver. The first message has a characteristic identifying the first message as an alert message. A location of the first cellular communication device is determined. A plurality of second cellular communication devices that are within a proximity of the first cellular communication device are identified. A second message is transmitted from the central transceiver to the second cellular communication devices. The second message is dependent upon the first message.

16 Claims, 5 Drawing Sheets

```
┌─────────────────────────────────────────────────┐
│ wirelessly broadcast an alert message from a first Bluetooth-based │
│ device, the alert message being broadcast with a Bluetooth │
│ broadcast protocol dedicated to alert messages, a user of │
│ the first Bluetooth-based device causing the alert message │
│ to be broadcast in response to the user sensing a danger │
└─────────────────────────────────────────────────┘
                         │ ⟵ 502
                         ▼
        ┌──────────────────────────────────┐
        │ use at least one second Bluetooth-based │ ⟵ 504
        │ device to receive the alert message │
        └──────────────────────────────────┘
                         │
                         ▼
┌─────────────────────────────────────────────────┐
│ convert the alert message to at least one of sound and │
│ visible text on the at least one second Bluetooth-based │
│ device such that a user of the second Bluetooth-based │
│ device is alerted by the converted alert message to the danger │
└─────────────────────────────────────────────────┘
                                              ⟵ 506
↗
500        FIG. 5
```

CLOSE PROXIMITY ALERT MESSAGING SYSTEM AND METHOD

BACKGROUND

1. Field of the Invention

The present invention relates to apparatuses and methods for broadcasting alert messages to groups of people within a geographic area.

2. Description of the Related Art

In response to some recent events in which gunmen have been on college campuses, the colleges have put into place a central facility for transmitting text messages to an entire campus body. A problem with this approach is that it necessitates finding out and keeping track of the phone numbers of each telephone near the campus. Another problem with this approach is that it includes no mechanism for contacting people who are merely passing through the area or who are just visiting the area for the day.

What is neither disclosed by nor obvious in view of the prior art is a close proximity broadcast message system that can alert anyone within a several miles of the system of a dangerous situation, or a situation that they may be interested in. What is also neither disclosed by nor obvious in view of the prior art is a system that enables a user to call an alert number such that anyone within a specified distance of the system may receive the message without the system having to know the person's specific phone number. Nor does the prior art disclose or make obvious a system that allows a cellular (or Bluetooth) device to receive broadcast messaging based on a device's proximity to the caller. Further, the prior art does not disclose or make obvious a system that enables a cellular or Bluetooth device to directly transmit to another cellular or Bluetooth device based on proximity global positioning system (GPS) coordinates or Bluetooth radio frequency range for alert communications.

SUMMARY

The present invention provides a method for alert messaging which transfers voice or text messages from a calling device to all similar communication devices within proximity of the calling device. A device that initiates the call using an alert number can have the voice or text message transferred to any device within a close proximity to the calling device. A cell phone "Caller" may initiate a call to a specific Alert Service Number (e.g., 211). The cellular network gets the message and the caller's GPS coordinates. The network determines those phones that are within a specific proximity to the caller and notifies those devices with the caller's original message (voice or text). The network also notifies other networks so they too can notify cellular devices within proximity to the caller. A specific Bluetooth broadcast message protocol is used in the case of Bluetooth devices. Any device within the Bluetooth transmission range receives the voice or text message from the Alerting device. There is no intermediary broadcaster similar to the cellular network in this Bluetooth embodiment.

The present invention could be incorporated as part of a cellular company's alert technology offering. The dialing of a specific phone number on a cellular device may initiate a call that the cellular company then automatically sends to every other cellular device in close proximity to the calling device (based on GPS coordinates). Alternatively, the pressing of an alert button on a Bluetooth device may initiate an alert message received by every other Bluetooth device in receiving range of the calling device. The receiving Bluetooth device may then notify its user of the alert message via sounds, lights or vibration, even if the user has set the Bluetooth device to refrain from notifying him of other, less urgent types of messages. The alert message, which could be text or voice, may be optionally received by any receiving device that allows such alert calls. Bluetooth devices may be configured in such a way as to receive these messages based on their RF (Bluetooth) range.

The invention comprises, in one form thereof, an alert broadcast method including wirelessly transmitting a first message from a first cellular communication device to a central transceiver. The first message has a characteristic identifying the first message as an alert message. A location of the first cellular communication device is determined. A plurality of second cellular communication devices that are within a proximity of the first cellular communication device are identified. A second message is transmitted from the central transceiver to the second cellular communication devices. The second message is dependent upon the first message.

The invention comprises, in another form thereof, an alert broadcast method including using a first cellular communication device to dial a phone number to thereby connect the first cellular communication device to a central transceiver. A first message is wirelessly transmitted from the first cellular communication device to the central transceiver. Geographic coordinates of the first cellular communication device are determined. A plurality of second cellular communication devices that are within a predetermined distance of the first cellular communication device are identified. A second message is transmitted from the central transceiver to the second cellular communication devices. The second message is dependent upon the first message.

The invention comprises, in yet another form thereof, an alert broadcast method including wirelessly broadcasting an alert message from a first Bluetooth-based device. The alert message is broadcast with a Bluetooth broadcast protocol dedicated to alert messages. A user of the first Bluetooth-based device causes the alert message to be broadcast in response to the user sensing a danger. At least one second Bluetooth-based device that is within the broadcast range of the first Bluetooth-based device is used to receive the alert message. The alert message is converted to sound and/or visible text on the at least one second Bluetooth-based device such that a user of the second Bluetooth-based device is alerted by the converted alert message to the danger within a broadcast range of the first Bluetooth-based device.

An advantage of the present invention is that it uses existing equipment that most people now carry.

Another advantage is that it eliminates the need to know the telephone numbers of each person who is to be informed within a geographic area.

Yet another advantage is that anyone who is aware of a danger or an event of interest in an area can transmit directly to anyone in the area who has a communication device, regardless of whether the recipient is normally in the area or is a temporary visitor.

A further advantage is that the present invention shortens the transmission time of the alert message to the recipient, and thus may save additional lives.

Still another advantage is that, while known solutions focus on connections within a network, or on communications based on devices within the same network, the method of the present invention enables interoperability between all devices that receive cellular communications. In an alternative embodiment, the method of the present invention enables interoperability between Bluetooth devices that are configured to accept alert broadcast transmissions, and that are positioned in close proximity to the transmitting device.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 5 is a flow chart illustrating another embodiment of an alert broadcast method of the present invention.

Figure 1:
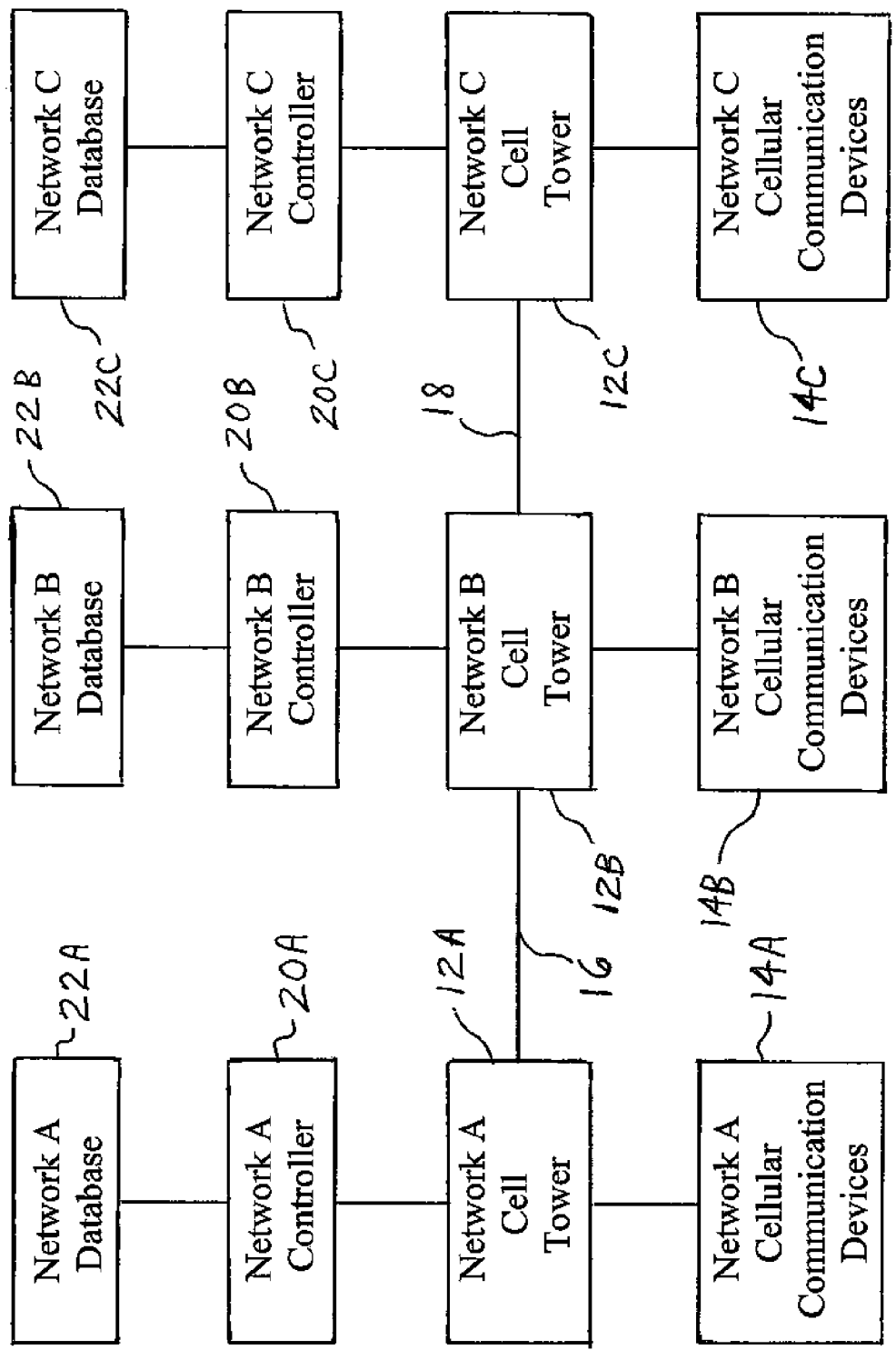
FIG. 1 is a block diagram of an alert messaging system in accordance with one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to FIG. 1, a cellular telephone system 10 in accordance with one embodiment of the present invention is illustrated. Cellular telephone system 10 generally enables close proximity message transmission across a number of cellular networks, such as networks A, B and C in FIG. 1. Each of networks A-C may include a respective cellular tower 12 that is a conduit for communication between cellular communication devices 14 within the network, such as cellular phones, digital assistants, etc. Each tower 12 may also enable communication between networks. For instance, network A may communicate with network B, as indicated at 16, and network B may communicate with network C, as indicated at 18. If towers 12A and 12C are within receiving range of each other, then they may communicate with each other directly. However, if towers 12A and 12C are not within receiving range of each other, then it is still possible for them to communicate with each other by using tower 12B as an intermediary.

Each network may include a respective network controller 20 which may control and/or direct communication traffic within its network and between its network and other networks. Each controller 20 may be in communication with a respective database 22 which stores data associated with the network. For example, each database 22 may store identification information for each of the cellular communication devices within its network. Each of cellular communication devices 14 may be GPS-compatible such that devices 14 each periodically transmits its current GPS geographic coordinates to its controller 20 via tower 12. Each controller 20 may store the received GPS geographic coordinates in its database 22 in association with the identification information for each of devices 14.

Figure 2:
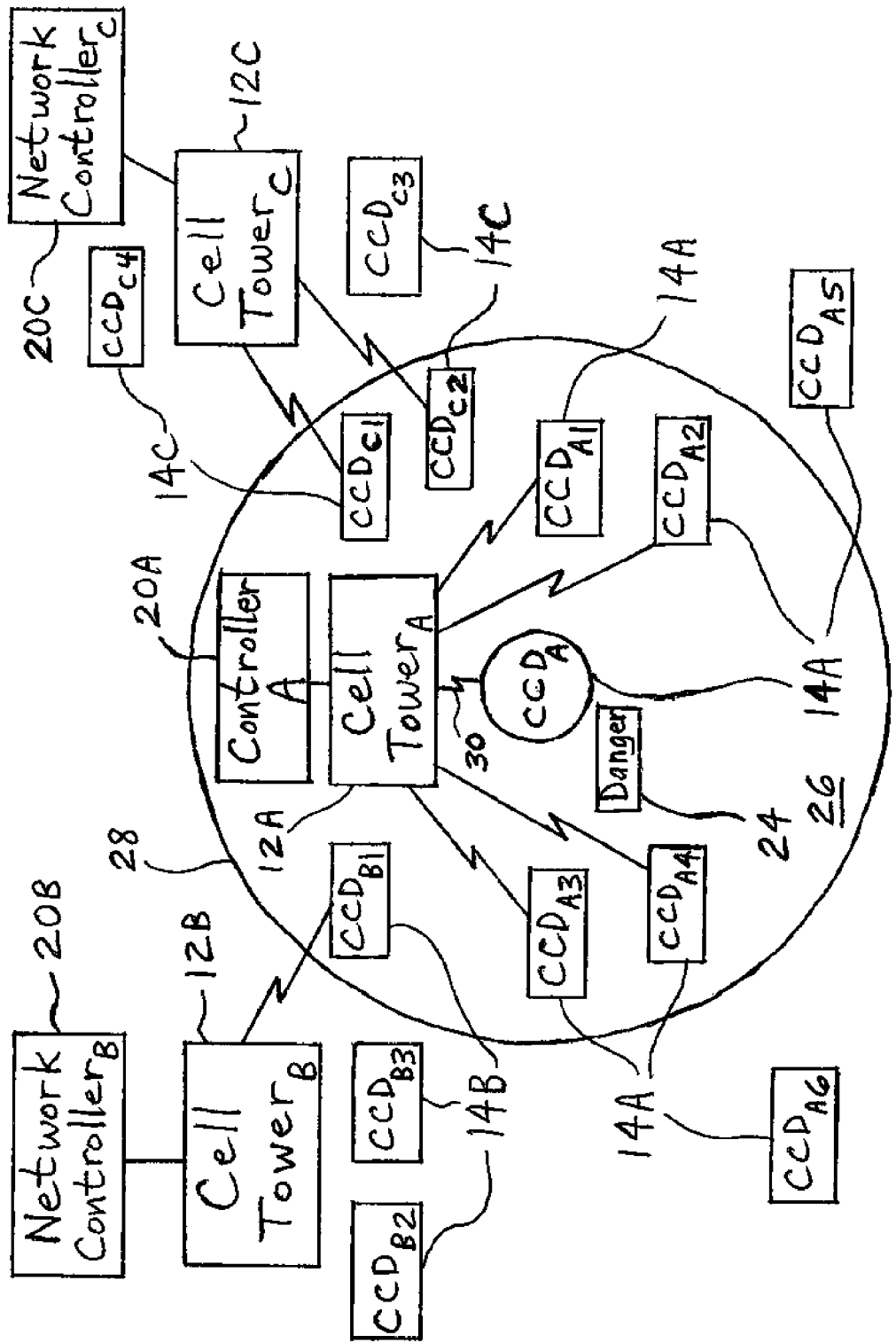
FIG. 2 is another block diagram further illustrating the alert messaging system of FIG. 1.

Referring now to FIG. 2, a specific implementation of system 10 in accordance with one embodiment of the present invention is illustrated. Assume an owner of a cellular communication device $CCD_A$ among cellular communication devices 14A observes an event 24 that he believes to be of interest to other people in his proximity 26. Proximity 26 may be defined by a circular boundary 28, with device $CCD_A$ being disposed in the middle of the circle. Proximity 26 may be defined as the area within a predetermined radius of device $CCD_A$. In another embodiment, the owner of cellular communication device $CCD_A$ may, via the user interface (not shown) of device $CCD_A$, select the radius of the proximity, or define some other irregular boundaries for the proximity.

In the embodiment of FIG. 2, event 24 is in the form of a danger to the people within proximity 26. As one example, the user of device $CCD_A$ may observe a danger in the form of someone pointing a gun at people. In another application, the danger may be perilous to only a particular person. For instance, the user of device $CCD_A$ may desire to enlist the assistance of others in finding a missing child or elderly person who the user of device $CCD_A$ perceives to be in danger.

Regardless of the reason that the user of device $CCD_A$ desires to contact or notify others within proximity 26, the user may use the interface of device $CCD_A$ to initiate (i.e., dial) a call, as indicated at 30. In one embodiment, the call is directed to a specific Alert Service Phone Number (211, for example). The content of the call may include a text message and/or voice message, such as "Shots fired at 10th & Vine," for example. Controller 20A of cellular network A may receive the message through cell tower 12A along with the identity of device $CCD_A$. Upon receiving the message, controller 20A may retrieve from database 22A the location information (e.g., GPS coordinates) associated with device $CCD_A$. Alternatively, the location information associated with device $CCD_A$ may be included with the message.

Having determined the location of calling device $CCD_A$, controller 20A may retrieve from database 22A location information associated with the other cellular communication devices 14A in network A. From that location information, controller 20A may determine those devices 14A that are within proximity 26, i.e., devices $CCD_{A1}$, $CCD_{A2}$, $CCD_{A3}$ and $CCD_{A4}$. Controller 20A may then notify those devices 14A that are within proximity 26 of the caller's original message (voice and/or text), and this notification may include a facsimile of the original message. However, controller 20A may refrain from notifying those devices 14A that are outside proximity 26, i.e., devices $CCD_{A5}$ and $CCD_{A6}$, as they may be too far away from the calling device $CCD_A$ for the alert message to be of interest to the users of these devices.

The notification may also include an indication of the source of the message, so that the users of devices 14A may judge the credibility of the message. For example, each such alert message as broadcast by controller 20A may include a preamble such as "According to a private citizen," or "According to police," etc.

In another embodiment, the degree to which a recipient device 14A may interrupt its user to notify him of the alert message is dependent upon a classification of the sender of the alert message. For example, if the sender of the alert message is a private citizen, then the recipient device 14A may silently provide a text message and/or voice mail. If the sender of the alert message is someone of some intermediate level of authority, such as a registered administrator on a college campus, then the recipient device 14A may periodically vibrate or audibly beep in addition to providing a text message and/or voice mail. However, if the sender of the alert message is someone of a highest level of authority, such as a policeman, then the recipient device 14A may take greater measures to attract the immediate attention of its user. For example, the recipient device 14A may vibrate, activate a light, and/or provide a voice message that is immediately and automatically audible, in addition to providing a text message and/or voice mail related to the alert message.

Network A may notify other networks B and C so they too can notify cellular devices within proximity 26 to device $CCD_A$. More particularly, controller 20A may transmit the alert message, location information associated with device $CCD_A$, and possibly information related to the location of boundary 28 to controllers 20B and 20C.

Having received the location of calling device $CCD_A$ and possibly of boundary 28, controller 20B may retrieve from database 22B location information associated with cellular communication devices 14B in network B. From that location information, controller 20B may determine those devices 14B that are within proximity 26, i.e., device $CCD_{B1}$. Controller 20B may then notify this device $CCD_{B1}$ that is within proximity 26 of the caller's original message (voice and/or text), and this notification may include a facsimile of the original message. However, controller 20B may refrain from notifying those devices 14B that are outside proximity 26, i.e., devices $CCD_{B2}$ and $CCD_{B3}$, as they may be too far away from the calling device $CCD_A$ for the alert message to be of interest to the users of these devices.

Similarly, having received the location of calling device $CCD_A$ and possibly of boundary 28, controller 20C may retrieve from database 22C location information associated with cellular communication devices 14C in network C. From that location information, controller 20C may determine those devices 14C that are within proximity 26, i.e., devices $CCD_{C1}$ and $CCD_{C2}$. Controller 20C may then notify these devices $CCD_{C1}$ and $CCD_{C2}$ that are within proximity 26 of the caller's original message (voice and/or text), and this notification may include a facsimile of the original message. However, controller 20C may refrain from notifying those devices 14C that are outside proximity 26, i.e., devices $CCD_{C3}$ and $CCD_{C4}$, as they may be too far away from the calling device $CCD_A$ for the alert message to be of interest to the users of these devices.

Figure 3:
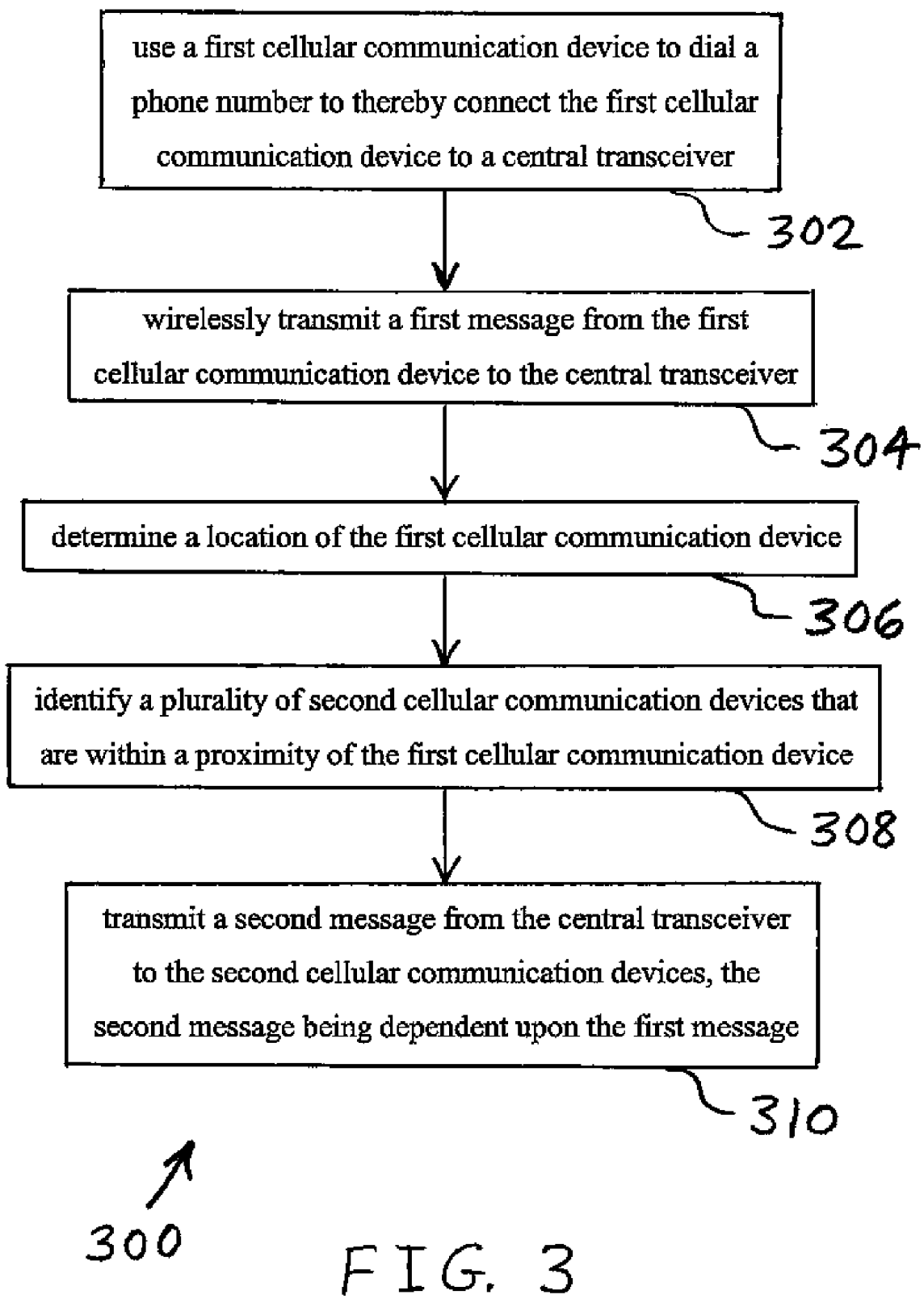
FIG. 3 is a flow chart illustrating one embodiment of an alert broadcast method of the present invention.

One embodiment of an alert broadcast method 300 of the present invention is illustrated in FIG. 3. In a first step 302, a first cellular communication device is used to dial a phone number to thereby connect a first cellular communication device to a central transceiver. For example, in the embodiment of FIG. 2, cellular communication device $CCD_A$ may be used to dial a phone number dedicated to alert messages (211 is proposed herein), as shown at 30, to thereby connect device $CCD_A$ to a central transceiver in the form of the network A controller 20A and cell tower$_A$ 12A.

In a next step 304, a first message is wirelessly transmitted from the first cellular communication device to the central transceiver. For instance, the user of device $CCD_A$ may observe a danger 24 and, in response thereto, may wirelessly send a voice and/or text message to controller 20A via the 211 telephone number. As an example of the observed danger 24, the user of device $CCD_A$ may notice that his child is missing from his home, and thus the user may transmit the voice and/or text message "three-year-old boy missing from 15 Oak St."

Next, in step 306, a location of the first cellular communication device may be determined. That is, device $CCD_A$ may be GPS-equipped such that device $CCD_A$ may periodically transmit its GPS geographical coordinates to controller 20A, which controller 20A may store in database 22A. Thus, controller 20A may retrieve the location information associated with device $CCD_A$ from database 22A. Alternatively, device $CCD_A$ may transmit its GPS geographical coordinates to controller 20A along with the alert message.

In a next step 308, a plurality of second cellular communication devices that are within a proximity of the first cellular communication device are identified. In the embodiment of FIG. 2, controller 20A may retrieve from database 22A the locations of the other CCDs in network A. Thereby knowing the locations of all of the CCDs in network A, controller 20A may calculate which of the other CCDs in network A are within a predetermined radius of device $CCD_A$, i.e, are within proximity 26. Accordingly, controller 20A may identify devices $CCD_{A1}$, $CCD_{A2}$, $CCD_{A3}$ and $CCD_{A4}$ as being within proximity 26. Similarly, controller 20B may identify device $CCD_{B1}$ as being within proximity 26, and controller 20C may identify devices $CCD_{C1}$, $CCD_{C2}$ as being within proximity 26.

In a final step 310, a second message is transmitted from the central transceiver to the second cellular communication devices, the second message being dependent upon the first message. In one embodiment, controller 20A may relay the alert message from device $CCD_A$ verbatim or in substantially the same form to the recipient CCDs. The relayed alert message may be in voice and/or text form. In another embodiment, controller 20A adds a preamble to the alert message before relaying the message to the recipient CCDs. For example, controller 20A may automatically add to the relayed message information identifying the time of day and/or location from which the alert message was received. Controller 20A may identify the person who sent the alert message and/or a classification of the person, i.e., whether the sender is acting in his personal capacity or in a professional capacity (e.g., policeman, fireman, health worker, school administrator, etc.). As a specific example, a maintenance worker may transmit the message "Gas fumes in the Student Union." Controller 20A may relay to the recipient CCDs in proximity 26 the message "As reported by a maintenance worker at the Student Union building at 10:48 am, 'Gas fumes in the Student Union.'" In the case of a text message, the preamble and the body of the message may be relayed in different fonts. In the case of a voice message, the preamble may be provided with a pre-recorded or computer-simulated voice, and the body of the message may be relayed in the sender's original voice.

Figure 4:
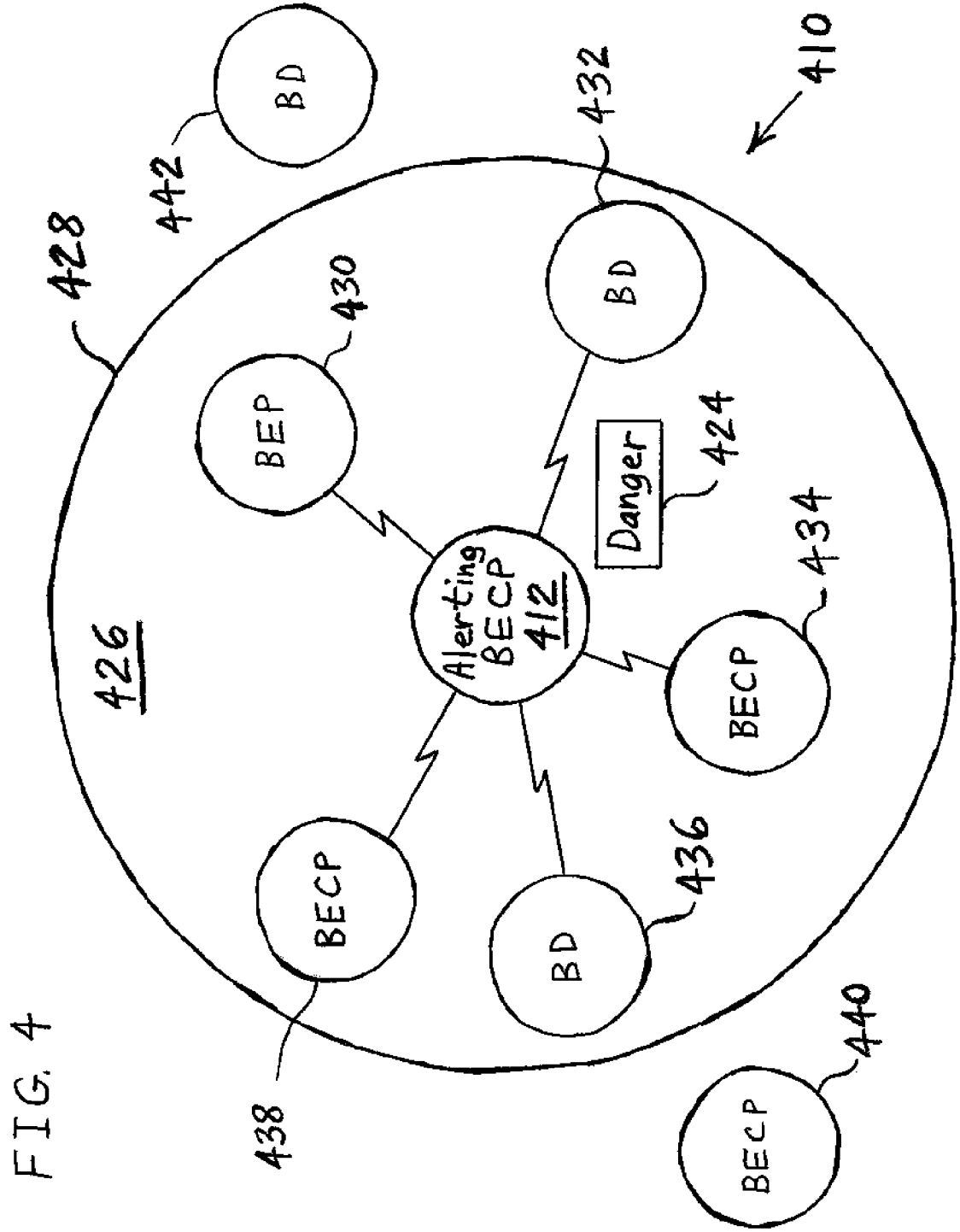
FIG. 4 is a block diagram of an alert messaging system in accordance with another embodiment of the present invention.

Referring to FIG. 4, a Bluetooth-compatible communication system 410 in accordance with one embodiment of the present invention is illustrated. Bluetooth-compatible communication system 410 generally enables close proximity message transmission among Bluetooth-compatible devices that are within transmission range of each other. This network of Bluetooth-compatible devices works a little differently than system 10 in that system 410 uses a specific Bluetooth broadcast message protocol for alert messages. Any Bluetooth-compatible device within the Bluetooth transmission range is able to receive the message from the alerting Bluetooth-compatible device. The alert message may be voice and/or text.

Assume an owner of a Bluetooth-enabled cellular phone (BECP) 412 observes an event 424 that he believes to be of interest to other people in his proximity 426. Proximity 426 may be defined by a circular boundary 428, with alerting BECP 412 being disposed in the middle of the circle. Proximity 426 may be defined as the area within a predetermined radius of BECP 412. In another embodiment in which the Bluetooth-based devices are GPS-equipped such that they are aware of their own respective locations, the owner of BECP 412 may, via the user interface (not shown) of BECP 412, select the radius of the proximity, or define some other irregular boundaries for the proximity. The boundary definition may be encoded along with the alert message. Recipient devices that are not within the defined boundary may ignore the message. Proximity 426 may be effectively defined by the user only to the extent that the defined proximity is within the transmission range of BECP 412.

In the embodiment of FIG. 4, event 424 is in the form of a danger to the people within proximity 426. As one example, the user of BECP 412 may observe a danger in the form of someone pointing a gun at people. In another application, the danger may be perilous to only a particular person. For instance, the user of BECP 412 may desire to enlist the assistance of others in finding a missing child or elderly person who the user of BECP 412 perceives to be in danger.

Regardless of the reason that the user of BECP 412 desires to contact or notify others within proximity 426, the user may use the interface of BECP 412 to initiate (i.e., dial) a call. The content of the call may include a text message and/or voice message, such as "Oil tanker spill at mile marker 58 on westbound I-94," for example. The user may press a dedicated pushbutton, or a sequence of other pushbuttons, on the interface of BECP 412 to designate the call as an alert message that is to be transmitted using a specific Bluetooth broadcast message protocol for alert messages.

Bluetooth-compatible devices within proximity 426, such as Bluetooth ear piece (BEP) 430, Bluetooth device (BD) 432, BECP 434, BD 436 and BECP 438 may be able to receive the alert message from BECP 412. BECP 440 and BD 442 may be unable to receive the alert message because they are outside a transmission range of BECP 412. However, in the case of a user-defined proximity boundary 428 (rather than a proximity boundary defined by the transmission range of BECP 412), it is possible that BECP 440 and/or BD 442 may receive the alert message. However, BECP 440 and/or BD 442 may ignore the received message, or may assign it a lower priority, because BECP 440 and BD 442 are outside the user-defined proximity.

Because the message is transmitted with the dedicated Bluetooth broadcast protocol for alert messages, the recipient Bluetooth-compatible devices recognize the message as an alert message, and may consequently assign the message a higher priority. That is, the recipient Bluetooth-compatible devices may interrupt other operations they are currently performing in order to bring the alert message to the user's attention. Regardless of whether the recipient device is currently being used by the user, the recipient device may notify the user of the reception of the alert message by audibly beeping, audibly delivering the voice portion of the message, turning on or flashing a light, vibrating, and/or displaying a text portion of the message on a screen of the recipient device.

An embodiment of a Bluetooth-based alert broadcast method 500 of the present invention is illustrated in FIG. 5. In a first step 502, an alert message is wirelessly broadcast from a first Bluetooth-based device, the alert message being broadcast with a Bluetooth broadcast protocol dedicated to alert messages, a user of the first Bluetooth-based device causing the alert message to be broadcast in response to the user sensing a danger. For example, in the embodiment of FIG. 4, a user of BECP 412 may observe a danger 424, and in response thereto, may place BECP 412 in an alert message transmission mode, such as by pressing a dedicated pushbutton or by pressing a sequence of multi-functional pushbuttons on BECP 412. The user may then speak and/or key in an alert message describing the danger. When in the alert message transmission mode, BECP 412 may transmit the alert message with the Bluetooth broadcast alert message protocol.

In a next step 504, at least one second Bluetooth-based device is used to receive the alert message. For instance, Bluetooth devices 430, 432, 434, 436 and 438 may be within the transmission range of BECP 412 and thus may receive the alert message. Alternatively, Bluetooth devices 430, 432, 434, 436 and 438 may be within a user-defined boundary 428 and thus may choose to accept and act upon the alert message.

In a final step 506, the alert message is converted to at least one of sound and visible text on the at least one second Bluetooth-based device such that a user of the second Bluetooth-based device is alerted by the converted alert message to the danger. That is, recipient Bluetooth devices 430, 432, 434, 436 and 438 may play back a voice version of the alert message on its speakers and/or display a text version of the alert message on its display screen. Thus, users of Bluetooth devices 430, 432, 434, 436 and 438 may become aware of the content of the alert message sent by BECP 412.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An alert broadcast method, comprising the steps of:
   wirelessly transmitting a first message from a first cellular communication device to a central transceiver, the first message having a characteristic identifying the first message as an alert message;
   determining a location of the first cellular communication device;
   identifying a plurality of second cellular communication devices that are within a proximity of the first cellular communication device, a first subset of the second cellular communication devices being within a first cellular network, and a second subset of the second cellular communication devices being within a second cellular network; and
   transmitting a second message from the central transceiver to the second cellular communication devices, the second message being dependent upon the first message, wherein the first cellular communication device is within the first cellular network, the central transceiver comprising a first central transceiver, the second cellular network including a second central transceiver, the second central transceiver relaying the second message from the first central transceiver to the second cellular communication devices within the second cellular network.

2. The method of claim 1 further comprising the step of using the first cellular communication device to dial a phone number to thereby connect the first cellular communication device to the central transceiver, wherein the phone number is dedicated to alert messages.

3. The method of claim 1 wherein the second message is a facsimile of the first message.

4. The method of claim 1 further comprising the step of sending location information related to the first cellular communication device from the first cellular network to the second cellular network.

5. The method of claim 1 wherein the identifying step is performed in the second cellular network for the second cellular communication devices that are within the second cellular network.

6. The method of claim 1 comprising the further step of the user defining an irregular boundary around the first cellular communication device for the proximity.

7. The method of claim 1 wherein the second message includes an indication of an identity of a user of the first cellular communication device.

8. The method of claim 1 wherein a degree to which the second cellular communication device may interrupt a user of the second cellular communication device to notify the user of the second message is dependent upon a classification of a user of the first cellular communication device.

9. An alert broadcast method, comprising the steps of:
using a first cellular communication device to dial a phone number to thereby connect the first cellular communication device to a central transceiver;
wirelessly transmitting a first message from the first cellular communication device to the central transceiver;
determining geographic coordinates of the first cellular communication device;
the user selecting a radius from the first cellular communication device within which a second message dependent upon the first message is to be broadcast;
identifying a plurality of second cellular communication devices that are within the selected radius of the first cellular communication device; and
transmitting the second message from the central transceiver to the second cellular communication devices.

10. The method of claim 9 wherein the first message has a characteristic identifying the first message as an alert message.

11. The method of claim 9 wherein the phone number is dedicated to alert messages.

12. The method of claim 9 wherein the second message is a facsimile of the first message.

13. The method of claim 9 wherein a first subset of the second cellular communication devices are within a first cellular network, and a second subset of the second cellular communication devices are within a second cellular network.

14. The method of claim 13 wherein the first cellular communication device is within the first cellular network, the central transceiver comprising a first central transceiver, the second cellular network including a second central transceiver, the second central transceiver relaying the second message from the first central transceiver to the second cellular communication devices within the second cellular network.

15. The method of claim 13 further comprising the step of sending the geographic coordinates of the first cellular communication device from the first cellular network to the second cellular network.

16. The method of claim 13 wherein the identifying step is performed in the second cellular network for the second cellular communication devices that are within the second cellular network.

* * * * *